(12) United States Patent
Brister

(10) Patent No.: US 6,260,516 B1
(45) Date of Patent: Jul. 17, 2001

(54) SAFETY FUEL TANK AND FILLER CAP APPARATUS

(76) Inventor: Charles Brister, 505 Ellis Rd., Amite, LA (US) 70422

( * ) Notice: Subject to any disclaimer, the term of this patent is extended or adjusted under 35 U.S.C. 154(b) by 0 days.

(21) Appl. No.: 09/452,653

(22) Filed: Dec. 1, 1999

Related U.S. Application Data

(63) Continuation-in-part of application No. 09/288,402, filed on Apr. 8, 1999, now Pat. No. 6,112,714, which is a continuation-in-part of application No. 09/267,877, filed on Mar. 11, 1999, now abandoned.

(51) Int. Cl.$^7$ ........................................................ F01P 9/02
(52) U.S. Cl. ........................................ 123/41.15; 123/198 D
(58) Field of Search .............................. 123/41.15, 41.54, 123/198 D

(56) References Cited

U.S. PATENT DOCUMENTS

| | | | |
|---|---|---|---|
| 416,103 | 11/1889 | Harter . | |
| 1,117,741 | 11/1914 | Wood, Jr. . | |
| 2,598,067 | 5/1952 | O'Brien | 110/18 |
| 3,057,140 | 10/1962 | Ridenour et al. | 56/25.4 |
| 3,387,874 | 6/1968 | Holtkamp | 292/201 |
| 3,390,909 | 7/1968 | Nagel | 292/201 |
| 3,568,421 | 3/1971 | Smith et al. | 56/255 |
| 3,664,698 | 5/1972 | Stropkay | 292/201 |
| 3,750,378 | 8/1973 | Thorud et al. | 56/10.5 |
| 3,795,417 | 3/1974 | Cohen | 292/144 |
| 3,885,547 | 5/1975 | Doepke et al. | 123/198 |
| 3,942,604 | 3/1976 | Black, III | 180/103 R |
| 3,969,875 | 7/1976 | Nofel | 56/10.2 |
| 4,236,494 | 12/1980 | Fairchild | 123/630 |
| 4,277,094 | 7/1981 | Roue | 296/1 |
| 5,044,678 | 9/1991 | Detweiler | 292/144 |
| 5,140,951 | * 8/1992 | Carr | 123/41.15 |
| 5,551,866 | 9/1996 | Josephs et al. | 123/198 D |

* cited by examiner

Primary Examiner—John Kwon
(74) Attorney, Agent, or Firm—Garvey, Smith, Nehrbass & Doody, LLC

(57) ABSTRACT

A safety fuel tank and filler cap apparatus is disclosed for use with a powered implement such as a lawn mower, tiller, weed trimmer or the like. The apparatus includes a locking mechanism that can be mounted on the engine body or fuel tank that disallows removal of the filler cap until the engine has cooled to a predetermined temperature that will not cause the fuel to ignite.

21 Claims, 5 Drawing Sheets

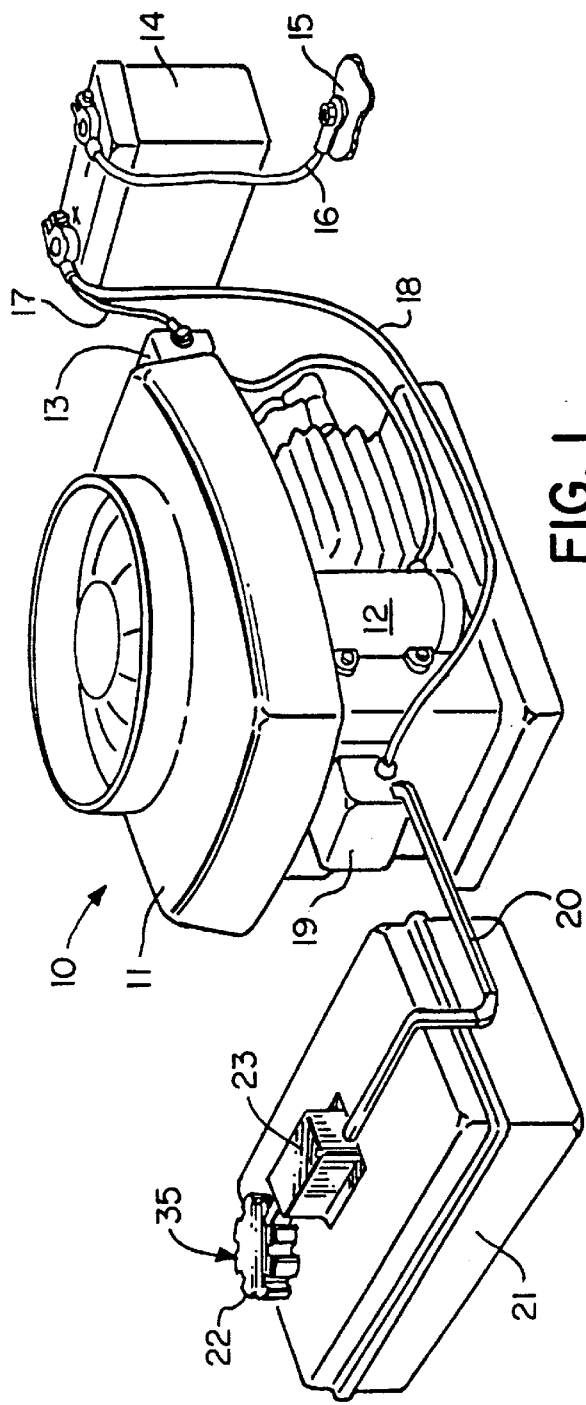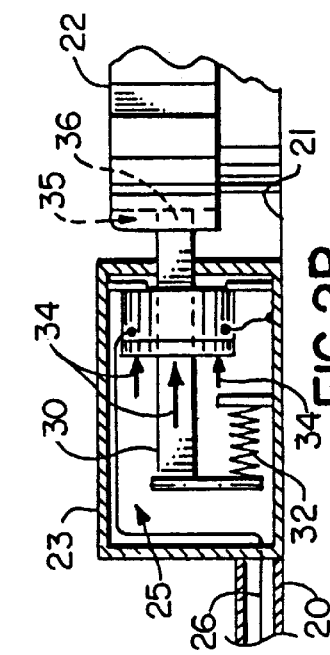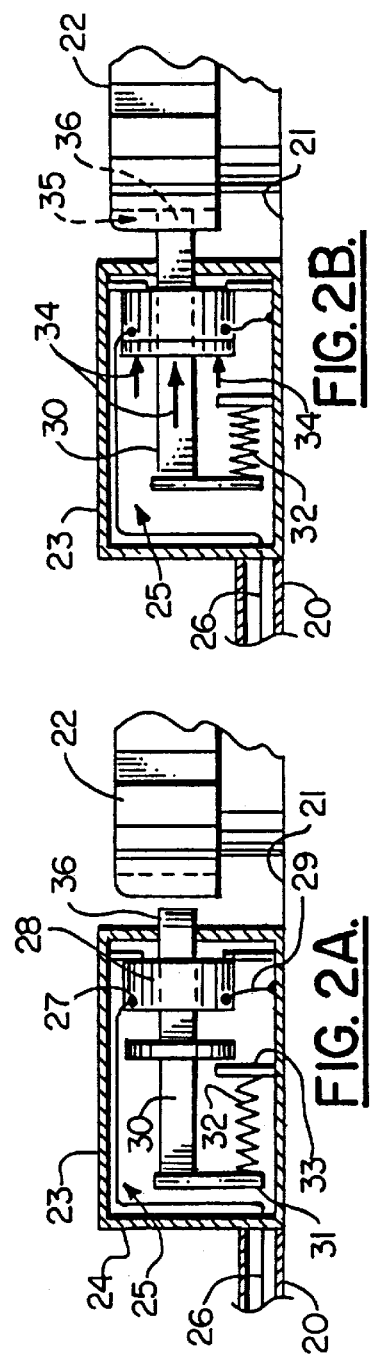

SAFETY FUEL TANK AND FILLER CAP APPARATUS

CROSS-REFERENCE TO RELATED APPLICATIONS

This is a continuation-in-part of U.S. Ser. No. 09/288,402 filed Apr. 8, 1999 now U.S. Pat. No. 6,112,714 which is a continuation in part of U.S. Ser. No. 09/267,877, filed Mar. 11, 1999 ABN, each incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to small internal combustion engines of the type having a closely positioned fuel tank, and that are used to power outdoor implements such as mowers, tillers, lawn vacuums, weed trimmers, snow blowers, water blasters and the like. More particularly, the present invention relates to an improved safety fuel tank and filler cap apparatus that disallows removal of the fuel filler cap portion of the apparatus from the fuel tank when the engine is too hot, such as above a selected safe threshold value.

2. General Background of the Invention

The flash point of a liquid such as gasoline should not be confused with the temperature necessary to ignite the vapors, for unless a source of heat considerably hotter than the flash point of the fuel comes into direct contact with the vapors, the fuel will merely give off vapors without burning. An essential factor in the process of combustion is oxygen. Without oxygen, even the most flammable vapors will not burn. Under normal conditions, a flame draws the amount of oxygen necessary to sustain combustion from the air. When the oxygen content of the air falls below about 15%, there is an immediate extinguishment of practically all flames. There is a wide temperature difference between the flash point of a fuel and the ignition temperature. For example, the flash point (vapor given off) of gasoline is minus 43 degrees centigrade (minus 45 degrees fahrenheit), and the ignition temperature (heat necessary to ignite the mixture) is 257 degrees centigrade (490 degrees fahrenheit). A small flame can be drawn into lube oil which is at average room temperature and it will not burn, but with the addition of burning gasoline, vapors soon rise and burn to raise the temperature of the surrounding oil to the flash point.

Every year, fires cause serious and sometimes fatal bodily injury to operators of small outdoor or yard and garden implements such as lawn mowers, lawn vacuums, weed trimmers, water blasters and the like. One of the most common safety problems is associated with the attempt by individuals to add gasoline to the internal combustion engine of a lawn mower or like implement that is still running. Sometimes, an implement gradually loosens the gas filler cap because of vibration. Typically, these implements position the fuel tank and its filler neck very close to the engine block. Fuel that spills from the fuel tank or when filling the tank may come into contact with hot surfaces on the engine block or accessories. If the user is not paying close attention to the gas tank and its filler cap, gasoline can begin to leak when the cap is loosened. This problem is especially acute with rear drive type implements such as go-karts, riding lawn mowers and lawn tractors wherein the gasoline tank may be behind the operator or underneath a seat or hood preventing the user from seeing it. Many tractor style riding lawn mowers have such a hidden fuel tank and filler cap.

Many of these implements are operated by adolescent children that are not fully informed by their parents about the danger of filling fuel tanks with gasoline when the vehicle engine block is hot from operation.

Many manufacturers use decal warning stickers and user's manual warnings to warn a user to not remove the fuel filler cap until the engine cools for at least a couple of minutes. Despite such warnings, many users have a bad habit of smoking when operating such an implement, so that if the cap loosens, the operator does not notice the escape of fumes if the engine continues to run.

Generators are often filled when running because the user does not want to interrupt the flow of electricity.

All of these situations are hazardous if the engine continues to run when the filler cap is removed.

BRIEF SUMMARY OF THE INVENTION

The present invention provides an improved safety fuel tank and filler cap apparatus for supplying fuel to an internal combustion engine.

The apparatus includes an exposed fuel tank having a fill opening, a fuel filler flange surrounded by an adjoining fuel tank outer surface, the flange extending a short distance from the filler opening in the fuel tank wall.

A filler cap fits the fuel filler flange to form a closure of the tank at the fill opening, the filler tank and adjoining fuel tank outer surface being configured to enable a user to grip and turn the fuel filler cap.

A locking mechanism is interfaced between the fuel tank and filler cap that disallows removal of the filler cap. This construction prevents the user from filling the fuel tank with gasoline when the engine is still running or not running but still very hot.

The implement can be for example a lawn mower, go-kart, garden tractor, lawn vacuum, snow blower, tiller, chain saw, weed trimmer, hedge clipper, or log splitter.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a perspective view of the preferred embodiment of the apparatus of the present invention;

FIG. 2A is a fragmentary elevational view of the preferred embodiment of the apparatus of the present invention;

FIG. 2B is a fragmentary view of the preferred embodiment of the apparatus of the present invention shown in locking position;

DETAILED DESCRIPTION OF THE INVENTION

Figure 3:
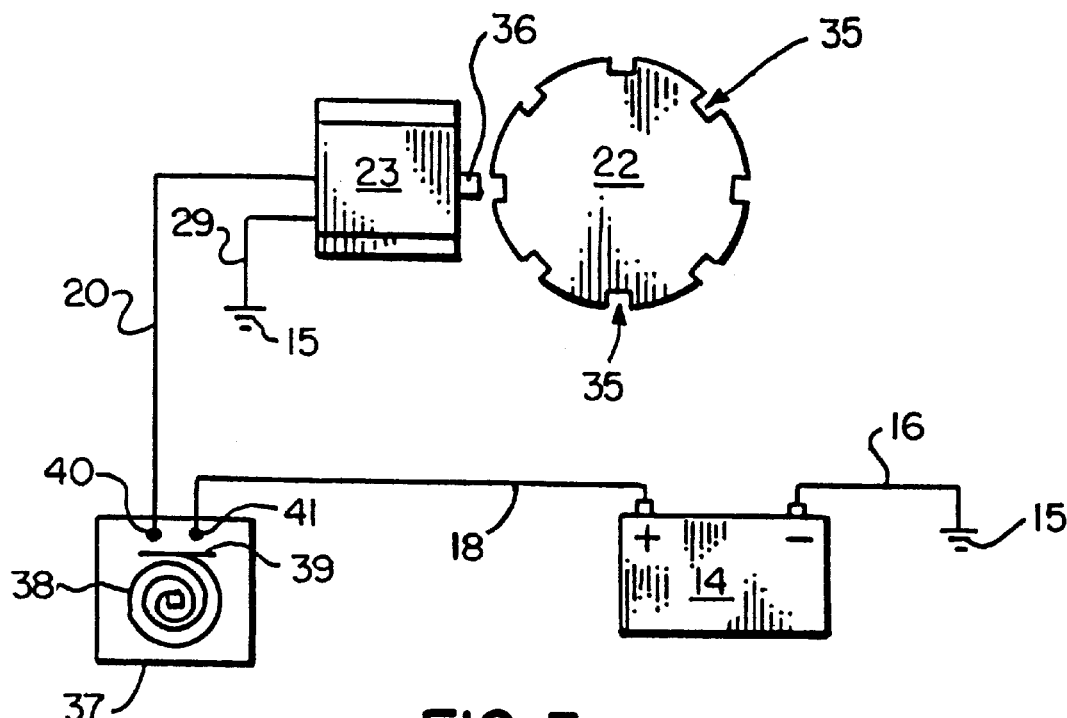
FIG. 3 is a schematic top view of the preferred embodiment of the apparatus of the present invention showing the cap in an unlocked position.

FIGS. 1–2B show the preferred embodiment of the apparatus of the present invention designated generally by the numeral 10 in FIG. 1. Safety fuel tank and cap apparatus 10 in FIG. 1 is used with an internal combustion engine 11, such as a lawn mower engine having a starter 12, starter solenoid 13, and powered by battery 14.

Engine 11 has a fuel tank 21 that is often closely positioned to the engine block 11A of engine 11. Fuel tank 21 has an opening for enabling fuel to be added, and a fuel filler closure cap 22 that can seal the fuel tank opening. This overall arrangement of engine 11, battery 14, fuel tank 21 is the same for all embodiments.

Wiring interconnecting battery 14, engine 11 and the remaining components of the apparatus 10 of the present invention are shown in FIG. 1. Such wiring includes ground 15 that communicates with battery 14 via battery cable 16 and cable 17 that communicates with starter solenoid 13. Cable 18 extends between battery 14 and heat sensor 19. A cable is also provided that links starter 12 and starter solenoid 13.

Cable 20 extends between heat sensor 19 and actuator 23. Actuator 23 is preferably mounted upon fuel tank 21 next to fuel filler cap 22 as shown in FIG. 1. The actuator 23 defines a locking mechanism that prevents the filler cap 22 from being removed when the engine temperature is above a predetermined temperature that is near or below the ignition temperature of the fuel (or fuel vapor) in and around tank 21.

Actuator 23 includes switch housing 24 having a housing interior 25 that contains plunger 30, as shown in FIGS. 2A and 2B. Wire lead 26 is contained within cable 20 for supplying electrical power to actuator 23 as shown in FIGS. 2A and 2B.

Wire lead 26 connects to coil 28 at terminal 27. Coil 28 is preferably grounded, eg. with wire lead 29 to switch housing 24.

Plunger 30 moves between locked and unlocked positions. FIG. 2A shows the unlocked position of plunger 30. FIG. 2B shows the locked position of plunger 30. Plunger 30 is mounted within housing interior 25 through an opening at the center of coil 28. One end of plunger 30 is supported by flange 31 and spring 32. The other end of plunger 30 is supported by housing 24 at the opening through which plunger 30 extends. The actuator 23 functions as a solenoid to move the plunger 30 between locking and unlocking positions. Spring 32 normally holds plunger 30 in the unlocked position of FIG. 2A. The spring 32 extends between anchor plate 33 and plunger 30 at flange 31.

Cap 22 has a plurality of circumferentially spaced radially extending recesses 35, each sized and shaped to form a connection with plunger 30 at end portion 36. In FIG. 2B, arrows 34 indicate the movement of plunger 30 from an unlocked position to a locked position. During operation, heat sensor 19 monitors the temperature of engine 11. When the temperature of engine block 11A of engine 11 reaches a predetermined temperature that is at or near the ignition temperature of gasoline, heat sensor 19 sends an electrical signal via wire lead 26 to actuator 23 activating coil 28 to move plunger 30 to the locked position of FIG. 2B. When the temperature sensed by heat sensor 19 drops below a predetermined acceptable temperature value, the heat sensor 19 halts the electrical flow to actuator 23 so that return spring 32 moves plunger 30 to the unlocked position of FIG. 2A.

Figure 4:
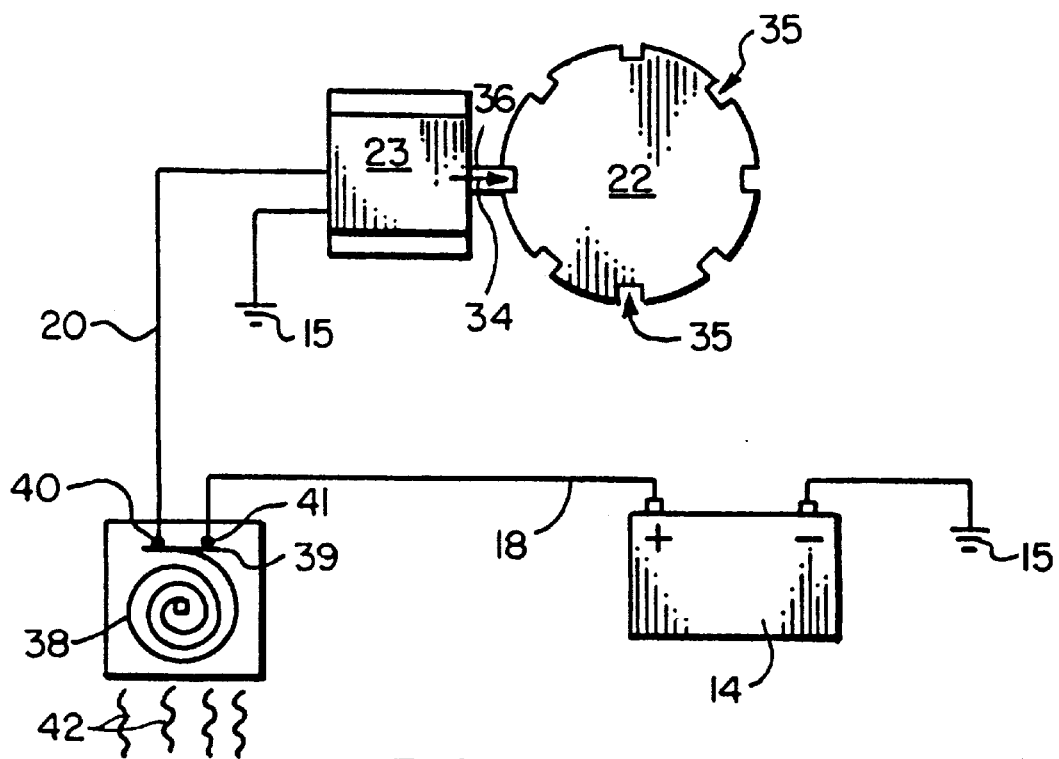
FIG. 4 is a schematic top view of the preferred embodiment of the apparatus of the present invention showing the cap in a locked position.

FIGS. 3 and 4 show a second embodiment 10A of the apparatus of the present invention using switch 37. Switch 37 is in the form of a coil 38 having contact bar 39. A pair of terminals 40, 41 are positioned next to contact bar 39 as shown in FIGS. 3 and 4. When excessive heat indicated by heat wave lines 42 in FIG. 4 is transferred to switch 37, coil 38 expands, pushing contact bar 39 into contact with terminals 40, 41. As the circuit is closed, battery 14 is able to supply power to actuator 23, closing a circuit activating plunger 30 and engaging the projecting portion 36 into a recess 35 of cap 22 an indicated by arrow 34 in FIG. 4.

Figure 5A:
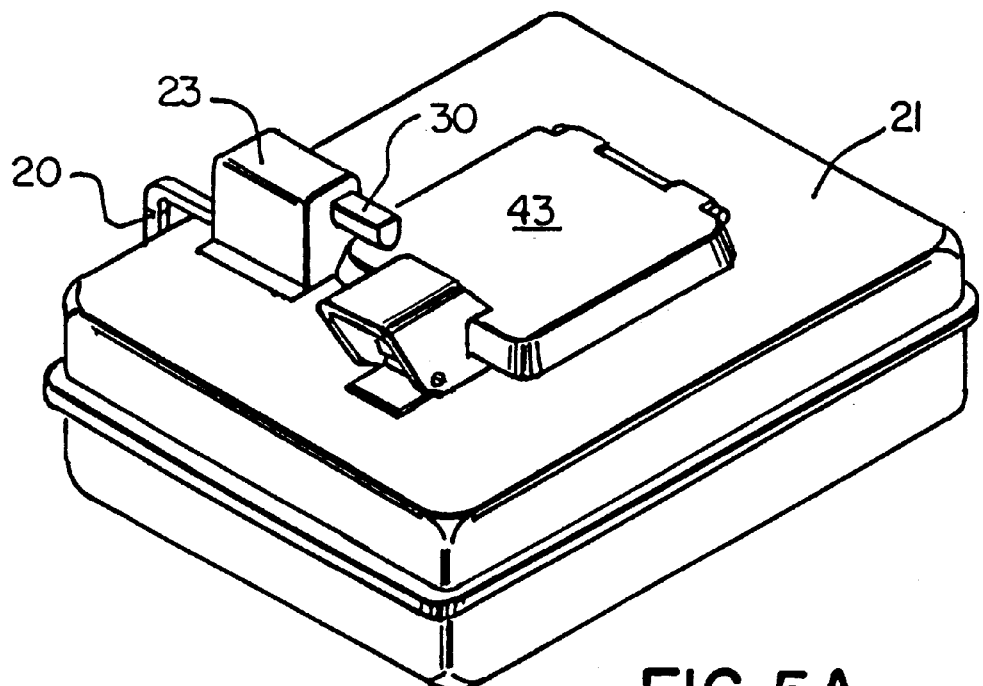
FIGS. 5A–5B are perspective views of a second embodiment of the apparatus of the present invention.
Figure 5B:
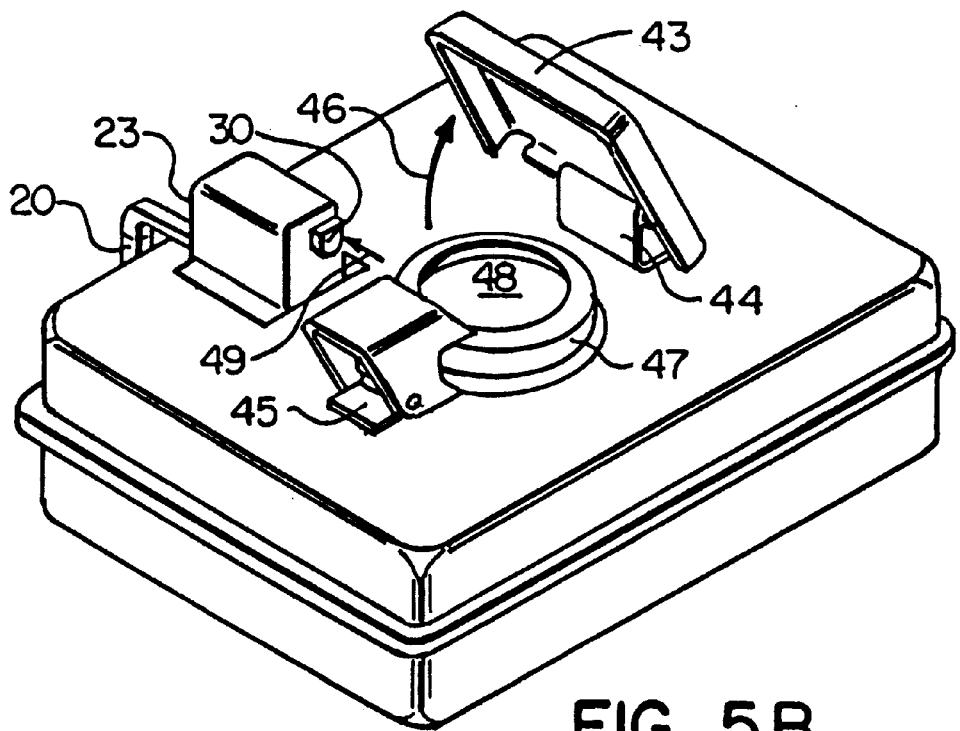

Another embodiment of the apparatus 10B of the present invention is shown in FIGS. 5A and 5B. In FIGS. 5A and 5B, cap 43 is mounted upon hinge 44 to move between open and closed positions as indicated by arrow 46 in FIG. 5B. Latch 45 can be used to latch cap 43 in the closed position of FIG. 5A. The latch 45 can be depressed to open cap 43 as shown in FIG. 5B. Cap 43 closes opening 48 that is surrounded by filler neck 47. In the embodiment of FIGS. 5A and 5B, the actuator 23 and its plunger 30 are operated in the same fashion as shown and described herein relative to FIGS. 2A and 2B. However, in FIGS. 5A and 5B, the plunger 30 simply extends over cap 43 preventing it from opening. In FIG. 5B, when the plunger 30 is retracted as indicated by arrow 49, cap 43 can be opened.

Figure 6:
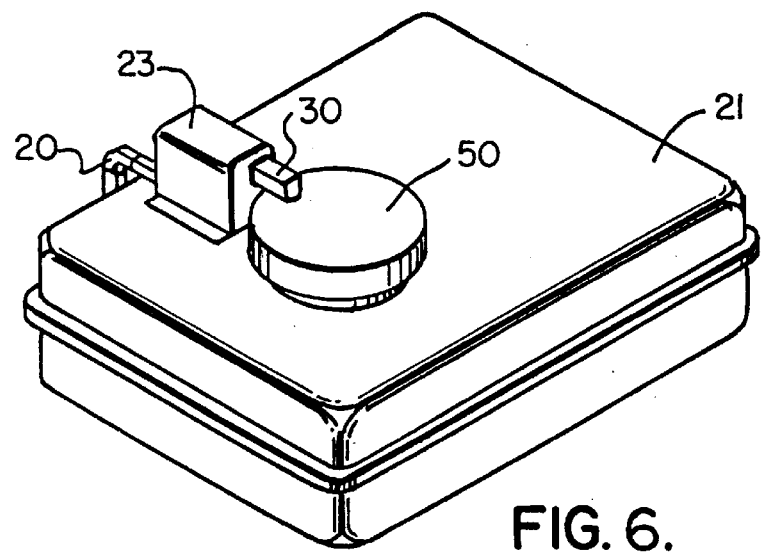
FIG. 6 is a perspective view of the third embodiment of the apparatus of the present invention.

In the embodiment of FIG. 6, apparatus 10C includes cap 50 is an internally threaded cap having internal threads that engage the external threads of a filler neck on fuel tank 21. As with the embodiment of FIGS. 5A and 5B, the embodiment of FIG. 6 extends the plunger 30 into a locking position to prevent a user from unthreading the cap 50 from its filler neck until the engine 11 has cooled below the desired temperature.

Figure 7A:
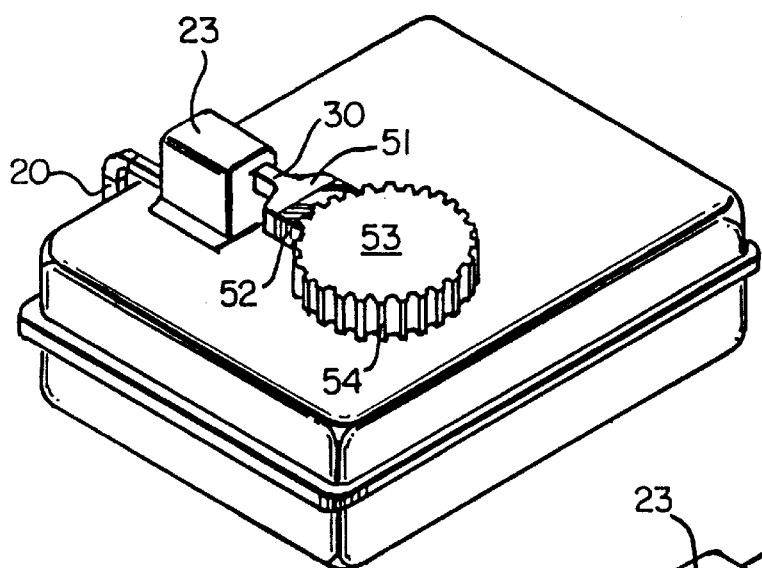
FIGS. 7A–7B are perspective fragmentary views of a fourth embodiment of the apparatus of the present invention.
Figure 7B:
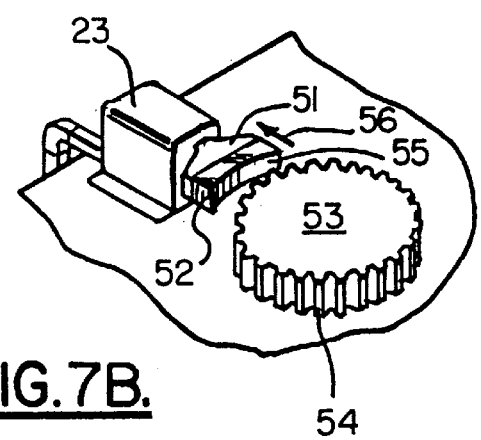

In FIGS. 7A and 7B, another embodiment of the apparatus of the present invention is shown, designated as 10D. In FIGS. 7A and 7B, the plunger 30 carries an enlarged end portion 51 having a rubber or resilient contact member 52. The rubber contact member 52 engages ribbed cap 53. The ribs 54 are sharp so that they are gripped by the resilient or rubber contact member 52 that conforms generally to the ribs.

The contact member 52 has a concave surface 55 that generally fits the contour of the external surface of the cap 53. In FIG. 7B, arrow 56 indicates movement of plunger 30 to an unlocked position.

Figure 8:
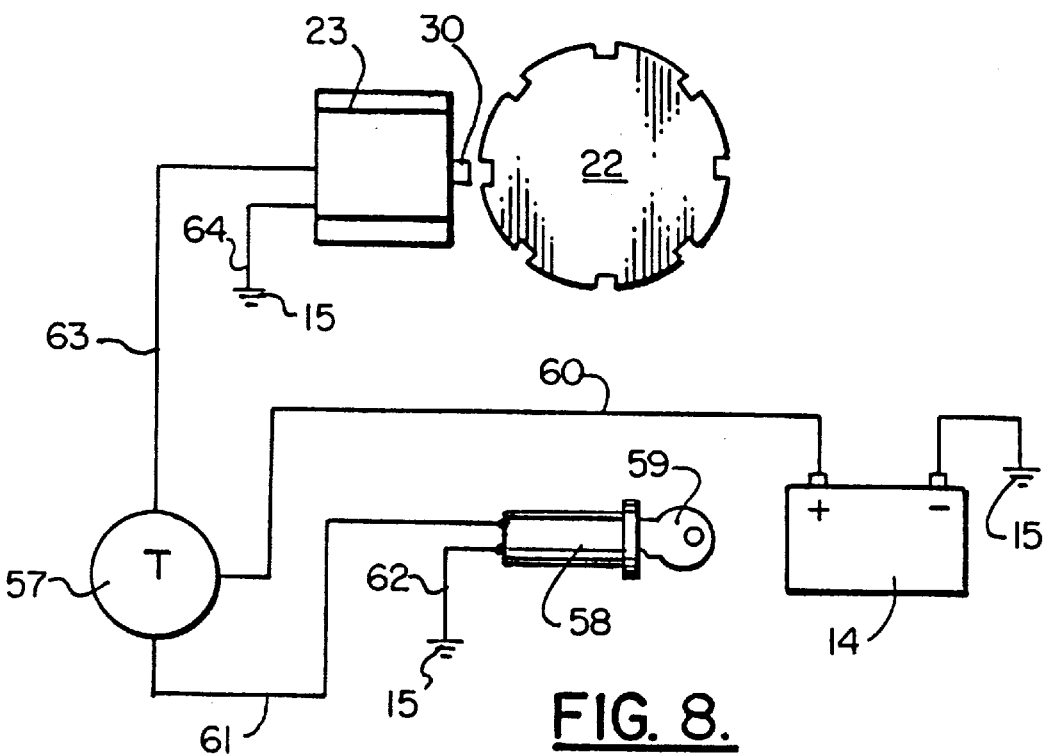
FIG. 8 is a schematic view of a fifth embodiment of the apparatus of the present invention.

In the embodiment of FIG. 8, the apparatus 10E includes a timer arrangement used in concert with the actuator 23 of FIGS. 2A and 2B for locking fuel cap 22 until the temperature of the engine block 11A of engine 11 has cooled. In FIG. 8, a timer 57 locks the cap 22 until a sufficient amount of time has the lapsed (2–5 minutes) so that the cap can be removed without a danger of explosion or fire. In FIG. 8, key switch 58 has key 59 for operating engine ignition and timer 57. When key 59 is turned to the "on" position, a timer circuit activates actuator 23 so that plunger 30 is moved to the locked position, and remains locked as long as the key is in the on position. When key 59 is turned to the "off"

position, timer 57 is activated to keep plunger in locked position. After a desired time interval of two to five minutes for example, timer 57 halts the flow of electricity from battery 14 to actuator 23 so that its return spring 32 (see FIGS. 2A–2B) moves the plunger to the unlocked position shown in FIG. 8. Wire cables 60–64 are shown in FIG. 8 interfacing battery 14, lock 58, timer 57 and actuator 23.

Figure 9:
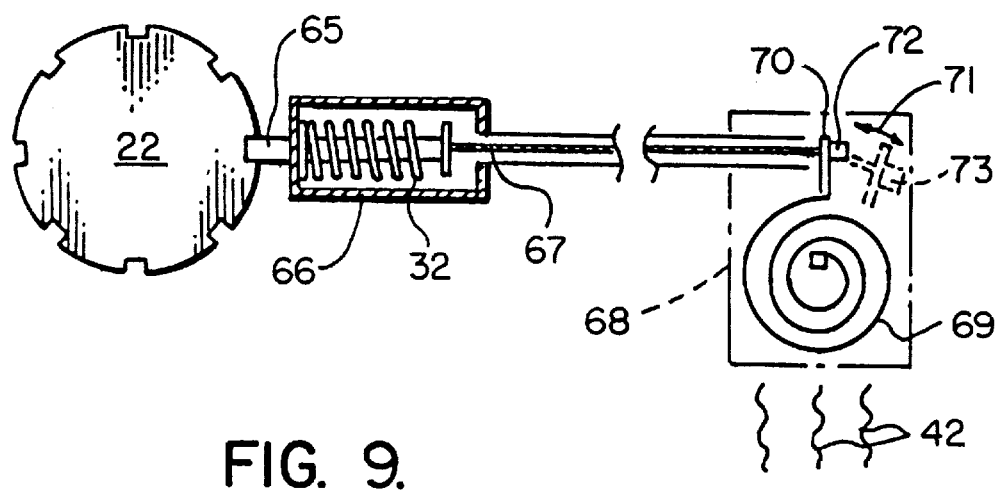
FIG. 9 is an schematic view of a sixth embodiment of the apparatus of the present invention.

In FIG. 9, the apparatus 10F includes plunger 65 that is manually operated using heat sensitive coil 69. Plunger 65 is mounted in switch housing 66. Plunger 30 is attached to cable 67. The cable 67 extends out of the switch housing 66 to engage radial arm 70 of coil 69. Coil housing 68 contains coil 69 and also provides a stop for limiting movement of free end 72 of radial arm 70. Arrow 71 in FIG. 9 indicates the movement of radial arm 70 and its free end 72 between a locking position shown in hard lines in FIG. 9 and an unlocked position shown in phantom lines in FIG. 9. In FIG. 9, the heat indicated by waves 42 causes coil 69 to expand to the locked position shown in FIG. 9. When the heat of the engine reduces to an acceptable temperature level, coil 69 cools and contracts, moving radial arm 70 to the unlocked position shown in phantom lines in FIG. 9 and pulling cable 67 and plunger 65 with it.

PARTS LIST

The following is a list of parts and materials suitable for use in the present invention:

NUMBER PART DESCRIPTION 10 safety fuel tank and cap apparatus
10A safety fuel tank and cap apparatus
10B safety fuel tank and cap apparatus
10C safety fuel tank and cap apparatus
10D safety fuel tank and cap apparatus
10E safety fuel tank and cap apparatus
10F safety fuel tank and cap apparatus
11 engine
11A engine block
12 starter
13 starter solenoid
14 battery
15 ground
16 battery cable
17 battery cable
18 battery cable
19 heat sensor
20 cable
21 fuel tank
22 fuel cap
23 actuator
24 actuator housing
25 housing interior
26 wire lead
27 terminal
28 coil
29 wire lead
30 plunger
31 flange
32 spring
33 anchor plate
34 arrow
35 recess
36 projecting end
37 switch
38 coil
39 contact bar
40 terminal
41 terminal
42 heat
43 cap
44 hinge
45 latch
46 arrow
47 filler neck
48 opening
49 arrow
50 cap
51 enlarged end portion
52 rubber contact member
53 ribbed cap
54 rib
55 concave surface
56 arrow
57 timer
58 key switch
59 key
60 wire cable
61 wire cable
62 wire cable
63 wire cable
64 wire cable
65 plunger
66 plunger housing
67 cable
68 coil housing
69 heat sensitive coil/bi-metal spring
70 radial arm
71 arrow
72 free end
73 stop position All measurements disclosed herein are at standard temperature and pressure, at sea level on earth, unless indicated otherwise.

The going embodiments are presented by way of example only; the scope of the present invention is to be limited only any the following claims.

What is claimed is:

1. A safety fuel tank and filler cap apparatus for supplying liquid fuel to an internal combustion engine comprising:
   a) an internal combustion engine body that includes an exposed fuel tank having a fill opening for containing said liquid fuel, an annular fuel filler flange surrounded by an adjoining fuel tank outer surface, said flange having a central axis;
   b) a filler cap that fits the fuel filler flange to form a closure of the tank at the fill opening when the cap center generally aligns with the flange central axis, said filler cap and adjoining fuel tank outer surface being configured to enable a user to grip and turn said fuel filler cap; and
   c) a locking mechanism that includes an actuator that prevents the cap from being removed when the engine temperature is above a predetermined temperature that is below the ignition temperature of said liquid fuel or its vapor.

2. The apparatus of claim 1 wherein locking mechanism includes a switch.

3. The apparatus of claim 2 wherein the switch is a timer switch.

4. The apparatus of claim 2 wherein the actuator is a thermo-electric actuator.

5. The apparatus of claim 2 wherein the switch includes a bimetallic strip mounted on the engine body.

6. The apparatus of claim 2 wherein the switch includes a switch member mounted next to the filler cap that does not interfere with a sealing of the fuel filler flange with the filler cap.

7. The apparatus of claim 6 wherein the fuel filler flange has a threaded portion and the filler cap has a top, and an annular skirt with threads thereon that engage the threaded portion of the flange, and wherein the switch member is mounted on the engine body to engage the annular skirt.

8. The apparatus of claim 6 wherein the filler cap has a top, an annular skirt with internal threads, and an unthreaded outer surface and wherein the switch member is mounted on the engine body to engage the annular skirt.

9. The apparatus of claim 6 wherein the filler cap has a top, an annular skirt with internal threads, and an unthreaded outer surface and wherein the switch member is mounted on the engine body at a position that enables part of the switch to engage the annular skirt.

10. The apparatus of claim 1 wherein the locking mechanism is a mechanism that includes a plunger that moves between operating and disabled positions, the plunger shifting positions when the engine reaches a temperature below said ignition temperature.

11. A safety fuel tank and filler cap apparatus for supplying fuel to an internal combustion engine comprising:
   a) an exposed fuel tank having a fill opening, an annular fuel filler flange surrounded by an adjoining fuel tank outer surface, said flange including a flange wall extending a short distance from the filler opening in said fuel tank wall, said annular flange having a central axis;
   b) a filler cap that fits the fuel filler flange to form a closure of the tank at the fill opening, said filler cap having a center, wherein the adjoining fuel tank outer surface is configured to enable a user to grip and turn said fuel filler cap; and
   c) a locking mechanism interfaced between the engine body and filler cap that disallows removal of the filler cap including portions mounted respectively on the fuel tank and on the fuel filler cap when the engine temperature is near the ignition temperature of the fuel vapor.

12. A powered implement, comprising:
   a) a frame;
   b) an internal combustion engine mounted on the frame that includes an engine body;
   c) an exposed fuel tank having a fill opening, a fuel filler flange surrounded by an adjoining fuel tank outer surface, said flange extending a short distance from the filler opening in said fuel tank wall;
   d) a filler cap that fits the fuel filler flange to form a closure of the tank at the fill opening, said filler cap and adjoining fuel tank outer surface being configure to enable a user to grip and turn said fuel filler cap; and
   e) a switch that disallows removal of the filler cap when the engine body has a temperature value that is at or near a temperature value that will ignite gasoline.

13. The apparatus of claim 12 wherein the switch is a thermoelectric switch.

14. The apparatus of claim 12 wherein the switch is a timer switch.

15. The apparatus of claim 12 wherein the switch is a mechanical switch that moves between operating and disabled positions, the switch including a member that shift positions when the engine reaches a selected temperature.

16. The apparatus of claim 13 wherein the switch includes a switch member mounted on the fuel tank.

17. The apparatus of claim 12 wherein the switch includes a switch member mounted next to the filler cap that does not interfere with a sealing of the fuel filler flange with the filler cap.

18. The apparatus of claim 17 wherein the filler cap has a top, and an annular skirt with internal threads, and wherein the switch engages the annular skirt in between the threads and the top when the switch closes.

19. The apparatus of claim 17 wherein the filler cap has a top, an annular skirt with internal threads, and an unthreaded outer surface and wherein the switch member is mounted to engage the annular skirt when the switch closes.

20. The apparatus of claim 17 wherein the filler cap has a top, an annular skirt with internal threads, and an unthreaded outer surface and wherein the switch member is positioned to engage the top when the switch closes.

21. A powered implement, comprising:
   a) a frame;
   b) an internal combustion engine mounted on the frame, said engine including a starter for starting the engine;
   c) the frame and engine supporting an exposed fuel tank for containing liquid fuel, said tank having a tank wall and a fill opening through said tank wall;
   d) a fuel filler flange on said tank surrounded by an adjoining fuel tank outer surface, said flange extending a short distance from the filler opening in said fuel tank wall;
   e) a filler cap that fits the fuel filler flange to form a closure of the tank at the fill opening, said filler cap and adjoining fuel tank outer surface being configured to enable a user to grip and turn said fuel filler cap; and
   f) a locking mechanism interfaced between the engine and filler cap that disallows removal of the filler cap when the engine has a temperature that is near the ignition temperature of the vapor of said liquid fuel.

* * * * *